(12) United States Patent
Burke et al.

(10) Patent No.: US 8,457,578 B2
(45) Date of Patent: Jun. 4, 2013

(54) DISCRETE TIME RECEIVER

(75) Inventors: Joseph Patrick Burke, Glenview, IL (US); Chengzhi Pan, San Diego, CA (US); Russell John Fagg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 12/346,559

(22) Filed: Dec. 30, 2008

(65) Prior Publication Data

US 2010/0167685 A1 Jul. 1, 2010

(51) Int. Cl.
*H04B 1/16* (2006.01)
(52) U.S. Cl.
USPC ............... 455/205; 455/207; 455/208
(58) Field of Classification Search
USPC .......... 455/334, 341, 325, 323, 313, 130, 455/234.1, 340, 230, 232.1, 339, 205–208, 455/231, 236.1, 255, 258; 375/318, 316, 375/349, 322, 140, 147; 708/313; 333/174; 327/91; 341/157, 172, 155
See application file for complete search history.

(56) References Cited

U.S. PATENT DOCUMENTS

| | | | | | |
|---|---|---|---|---|---|
| 5,392,043 | A | * | 2/1995 | Ribner | 341/143 |
| 5,583,501 | A | * | 12/1996 | Henrion et al. | 341/118 |
| 7,002,501 | B2 | * | 2/2006 | Gulati et al. | 341/155 |
| 7,102,559 | B2 | * | 9/2006 | Van Tuijl | 341/156 |
| 7,190,293 | B2 | * | 3/2007 | Clement et al. | 341/143 |
| 7,212,141 | B2 | | 5/2007 | Lakdawala et al. | |
| 7,301,492 | B2 | * | 11/2007 | Felder et al. | 341/172 |
| 7,356,069 | B2 | * | 4/2008 | Muhammad et al. | 375/140 |
| 7,411,444 | B2 | | 8/2008 | Muhammad et al. | |
| 7,514,993 | B2 | | 4/2009 | Konchitsky | |
| 7,565,393 | B2 | | 7/2009 | Lakdawala et al. | |
| 7,646,325 | B2 | * | 1/2010 | Schuur et al. | 341/172 |
| 7,671,658 | B2 | | 3/2010 | Harada et al. | |
| 7,729,682 | B2 | * | 6/2010 | Ragan et al. | 455/323 |
| 2002/0181614 | A1 | | 12/2002 | Mostafa et al. | |
| 2007/0072574 | A1 | | 3/2007 | Ragan et al. | |
| 2007/0115049 | A1 | | 5/2007 | Liu | |

(Continued)

FOREIGN PATENT DOCUMENTS

WO WO2007049199 5/2007
WO WO2008007328 1/2008

OTHER PUBLICATIONS

HS_Digi-RF_Patent_Search_Document_Phase_1.

(Continued)

*Primary Examiner* — Pablo Tran
(74) *Attorney, Agent, or Firm* — Kevin Cheatham

(57) ABSTRACT

A discrete time receiver includes a low noise transconductance amplifier (LNTA), a discrete time sampler, a passive discrete time circuit, and a switched capacitor amplifier. The LNTA amplifies a received RF signal and provides an amplified RF signal. The discrete time sampler samples the amplified RF signal (e.g., with multiple phases of a sampling clock) and provides first analog samples. The passive discrete time circuit decimates and filters the first analog samples and provides second analog samples. The switched capacitor amplifier amplifies the second analog samples and provides third analog samples. The discrete time receiver may further include a second passive discrete time circuit, a second switched capacitor amplifier, and an analog-to-digital converter (ADC) that digitizes baseband analog samples and provides digital samples. The discrete time receiver can flexibly support different system bandwidths and center frequencies.

34 Claims, 13 Drawing Sheets

U.S. PATENT DOCUMENTS

| | | | |
|---|---|---|---|
| 2008/0240316 A1 | 10/2008 | Yokoshima et al. | |
| 2009/0284285 A1* | 11/2009 | Fagg | 327/91 |
| 2010/0093302 A1* | 4/2010 | Abe et al. | 455/325 |
| 2010/0225419 A1* | 9/2010 | Pan et al. | 333/174 |
| 2011/0040818 A1* | 2/2011 | Fagg et al. | 708/313 |
| 2011/0150142 A1* | 6/2011 | Lee | 375/318 |
| 2011/0163900 A1* | 7/2011 | Pagnanelli | 341/143 |

OTHER PUBLICATIONS

Staszewski_TI_Discrete_Time_Rx.

International search report and Written Opinion—PCT/US2009/069618, International Search Authority—European Patent Office—May 12, 2010.

Mostafa M A I et al: "WCDMA receiver architecture with unique frequency plan" Sep. 12, 2001, ASIC/SOC Conference, 2001. Proceedings, 14th Annual IEEE International Sep. 12-15, 2001, Piscataway, NJ, USAJEEE, pp. 57-61 , XP010560756 ISBN: 9780780367418 p. 58, right-hand column, paragraph 2; figure 5.

Partial International Search Reoprt—PCT/US09/069618—International Search Authority EPO—Mar. 17, 2010.

* cited by examiner

DISCRETE TIME RECEIVER

BACKGROUND

I. Field

The present disclosure relates generally to electronics, and more specifically to a receiver.

II. Background

In a wireless communication system, a transmitter may digitally process (e.g., encode and modulate) digital data to generate digital output samples. The transmitter may further condition (e.g., convert to analog, amplify, filter, and frequency upconvert) the digital output samples to generate a radio frequency (RF) modulated signal. The transmitter may then transmit the RF modulated signal via a wireless channel to a receiver.

The receiver may receive the transmitted RF signal and perform the complementary processing on the received RF signal. The receiver may condition (e.g., amplify, filter, frequency downconvert, and digitize) the received RF signal to obtain digital input samples. The receiver may further process (e.g., demodulate and decode) the digital input samples to recover the transmitted data.

The receiver may employ various analog circuits such as amplifiers, mixers, and filters in a receive path to process the received RF signal. The receiver may support multiple radio technologies and/or multiple frequency bands. The receiver may have different receive paths for different radio technologies and/or different frequency bands. The analog circuits add to the cost of the receiver and further consume battery power. There is therefore a need in the art for techniques to efficiently process the received RF signal.

SUMMARY

A discrete time receiver that may be used for a wireless communication device is described herein. In one design, the discrete time receiver includes a low noise transconductance amplifier (LNTA), a discrete time sampler, a passive discrete time circuit, and a switched capacitor amplifier. The LNTA amplifies a received RF signal and provides an amplified RF signal. The discrete time sampler samples the amplified RF signal and provides first analog samples. An analog sample is an analog value for a discrete time instant. An analog sample may have any value whereas a digital sample may be restricted to certain quantized values. In one design, the discrete time sampler samples the received RF signal with multiple phases of a sampling clock at a first rate and provides the first analog samples at a second rate that is higher than (e.g., twice) the first rate. The passive discrete time circuit processes (e.g., decimates and filters) the first analog samples and provides second analog samples. The switched capacitor amplifier (which may be a chopped switched capacitor amplifier) amplifies the second analog samples and provides third analog samples.

The discrete time receiver may further include a second passive discrete time circuit and a second switched capacitor amplifier. The second passive discrete time circuit may decimate and filter the third analog samples and provide fourth analog samples. The second switched capacitor amplifier may amplify the fourth analog samples and provide baseband analog samples. An analog-to-digital converter (ADC) may digitize the baseband analog samples and provide digital samples.

The discrete time receiver can flexibly support different system bandwidths and center frequencies. The sampling clock rate may be configurable and selected based on the center frequency of a signal being received. The decimation factor(s) and the ADC clock rate may also be configurable and selected based on the bandwidth of the signal being received.

Various aspects and features of the disclosure are described in further detail below.

DETAILED DESCRIPTION

The discrete time receiver described herein may be used for various applications such as wireless communication, computing, networking, consumer electronics, etc. The discrete time receiver may also be used for various electronics devices such as wireless communication devices, cellular phones, broadcast receivers, personal digital assistants (PDAs), handheld devices, wireless modems, laptop computers, cordless phones, wireless local loop (WLL) stations, Bluetooth devices, consumer electronics devices, etc. For clarity, the use of the discrete time receiver in a wireless communication device, which may be a cellular phone or some other device, is described below.

Figure 1:
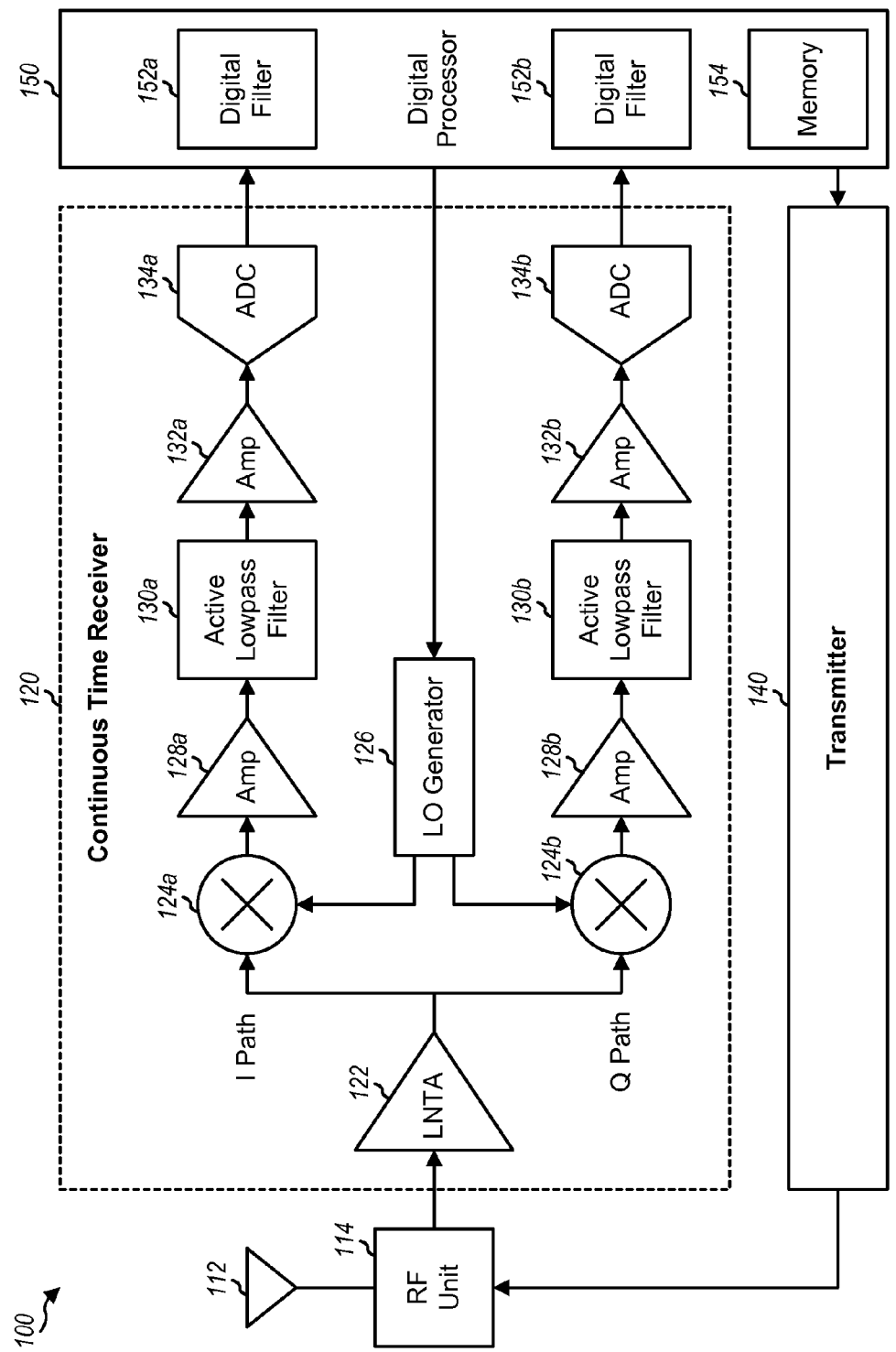
FIG. 1 shows a wireless communication device with a continuous time receiver.

FIG. 1 shows a block diagram of a wireless communication device 100, which includes a continuous time receiver 120 and a transmitter 140 that support bi-directional communication. In the receive path, an antenna 112 receives RF modulated signals transmitted by base stations and/or other transmitter stations and provides a received RF signal, which is routed through an RF unit 114 and provided to receiver 120. RF unit 114 may include an RF switch and/or a duplexer to multiplex RF signals for the transmit and receive paths. RF unit 114 may also include RF filters and/or other circuits. Within receiver 120, an LNTA 122 amplifies the received RF signal (which may be a voltage signal) and provides an amplified RF signal (which may be a current signal). Mixers 124a and 124b downconvert the amplified RF signal from RF to baseband and provide inphase (I) and quadrature (Q) downconverted signals. A local oscillator (LO) generator 126 generates I and Q LO signals used for frequency downconversion and provides the I and Q LO signals to mixers 124a and 124b, respectively. The I and Q downconverted signals from mixers 124a and 124b are amplified by amplifiers (Amp) 128a and 128b, filtered by active lowpass filters 130a and 130b, further amplified by amplifiers 132a and 132b, and digitized by ADCs 134a and 134b to obtain I and Q digital samples, which are provided to a digital processor 150. The I and Q digital samples may be processed by digital filters 152a and 152b and/or other processing units within digital processor 150.

In the transmit path, digital processor 150 processes data to be transmitted and provides digital output samples to transmitter 140. Transmitter 140 processes (e.g., converts to analog, filters, amplifies, and frequency upconverts) the digital output samples to generate an output RF signal, which is routed through RF unit 114 and transmitted via antenna 112. For simplicity, details of transmitter 140 are not shown in FIG. 1.

FIG. 1 shows an exemplary receiver design using a direct-conversion architecture, which frequency downconverts a signal from RF directly to baseband in one stage. FIG. 1 also shows the use of various analog circuit blocks such as LNTA 122, mixers 124, amplifiers 128 and 132, and active lowpass filters 130 in receiver 120. In general, it is desirable to simplify the design of the receiver in order to reduce cost, size, power consumption, etc.

Analog circuits are commonly fabricated in complementary metal oxide semiconductor (CMOS) in order to obtain various benefits such as lower cost, smaller size, etc. CMOS fabrication technology continually improves and transistor size continually shrinks. This allows higher clock speed to be used for smaller and faster transistors. The trend of higher clock speed and smaller CMOS transistor size means that some traditional analog circuits and functions may be more efficiently implemented with circuits and functions that are more digital in nature. The discrete time receiver described herein can take advantage of the fine time resolution offered by the higher clock speed of sub-micron CMOS processes in order to reduce receiver complexity, cost, size, and power consumption.

Figure 2:
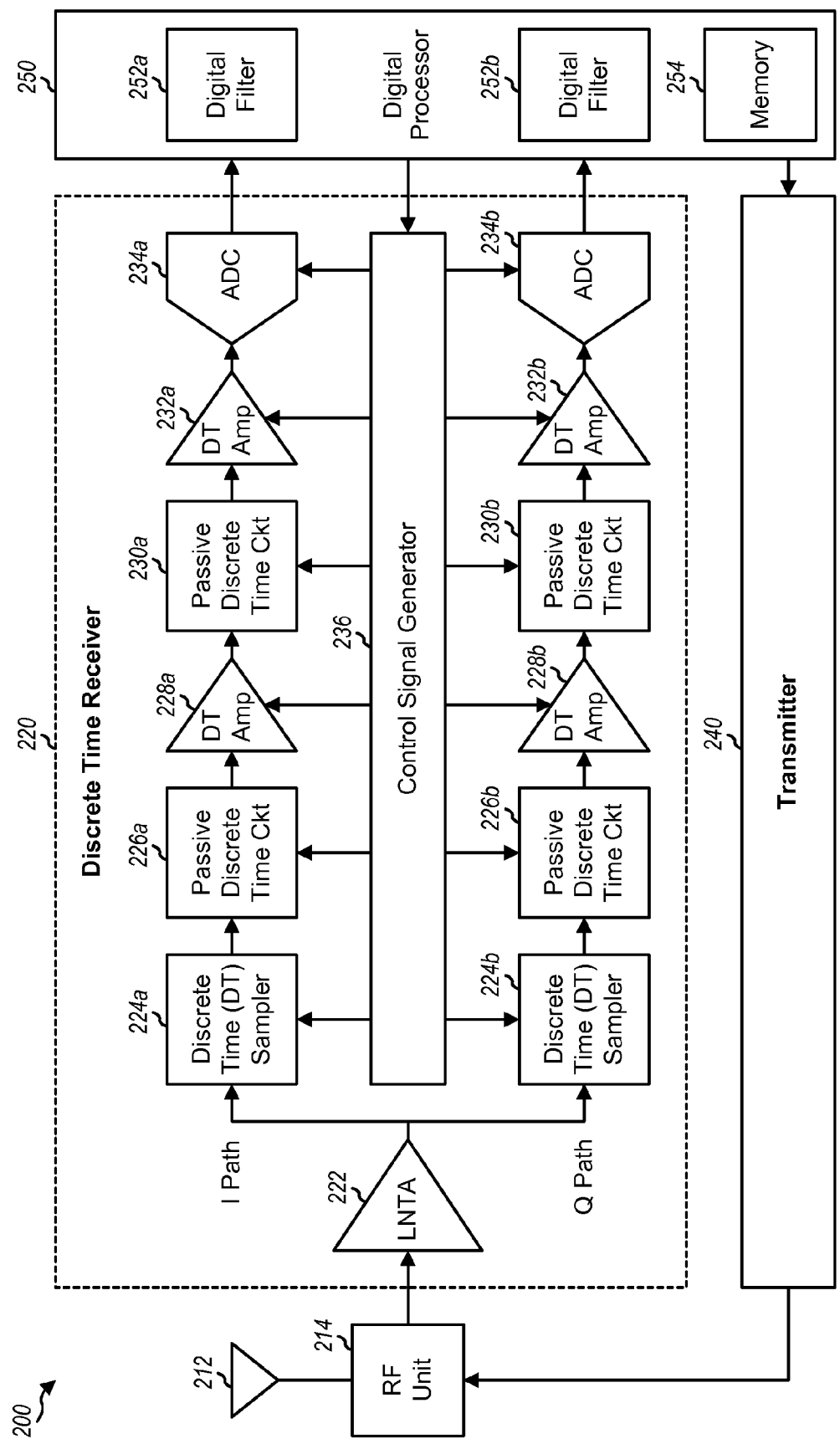
FIG. 2 shows a wireless communication device with a discrete time receiver.

FIG. 2 shows a block diagram of a design of a wireless communication device 200, which includes a discrete time receiver 220 and a transmitter 240 that support bi-directional communication. In general, wireless device 200 may include any number of receivers and any number of transmitters for any number of communication systems and frequency bands.

In the receive path, an antenna 212 receives RF modulated signals transmitted by base stations and/or other transmitter stations and provides a received RF signal, which is routed through an RF unit 214 and provided to discrete time receiver 220. Within discrete time receiver 220, an LNTA 222 amplifies the received RF signal and provides an amplified RF signal to both I and Q paths. Discrete time samplers 224a and 224b sample the amplified RF signal and provides I and Q input analog samples, respectively. Passive discrete time circuits (Ckt) 226a and 226b filter and decimate the I and Q input analog samples and provide first I and Q filtered analog samples, respectively. A passive discrete time circuit is a circuit that processes discrete time analog samples and is composed of only passive circuit components (e.g., switches and capacitors) and no active circuit components (e.g., transistors and amplifiers). Discrete time (DT) amplifiers 228a and 228b amplify the first I and Q filtered analog samples and provide I and Q amplified analog samples, respectively. Passive discrete time circuits 230a and 230b filter and decimate the I and Q amplified analog samples and provide second I and Q filtered analog samples, respectively. Discrete time amplifiers 232a and 232b amplify the second I and Q filtered analog samples and provide I and Q baseband analog samples, respectively. ADCs 234a and 234b digitize the I and Q baseband analog samples and provide I and Q digital input samples to a digital processor 250. The I and Q digital input samples may be processed by digital filters 252a and 252b and/or other processing units within digital processor 250. A control signal generator 236 generates sampling clocks for discrete time samplers 224a and 224b, control signals for discrete time circuits 226a through 232b, and ADC clocks for ADCs 234a and 234b.

In the transmit path, transmitter 240 processes digital output samples from digital processor 250 and provides an output RF signal, which is routed through RF unit 214 and transmitted via antenna 212. For simplicity, details of transmitter 240 are not shown in FIG. 2

Digital processor 250 may include various processing units for data transmission and reception as well as other functions. For example, digital processor 250 may include a digital signal processor (DSP), a reduced instruction set computer (RISC) processor, a central processing unit (CPU), etc. A memory 254 may store program codes and data for wireless device 200. Data processor 250 may be implemented on one or more application specific integrated circuits (ASICs) and/or other ICs.

FIG. 2 shows an exemplary design of discrete time receiver 220. In general, the processing of signals within discrete time receiver 220 may be performed by one or more stages of sampler, filter, decimator, amplifier, etc. The discrete time circuits may be arranged differently from the configuration shown in FIG. 2. Furthermore, other circuit blocks not shown in FIG. 2 may also be used to process the signals within the discrete time receiver. For example, one or more stages of variable gain amplifier (VGA) and lowpass filter may be located between discrete time samplers 224 and ADCs 234. Some circuit blocks in FIG. 2 may also be omitted. For example, passive discrete time circuits 230 and discrete time amplifiers 232 may be omitted, and discrete time amplifiers 228 may directly drive ADCs 234. All or a portion of discrete time receiver 220 may be implemented on one or more analog ICs, RF integrated circuits (RFICs), mixed-signal ICs, etc.

Figure 3:
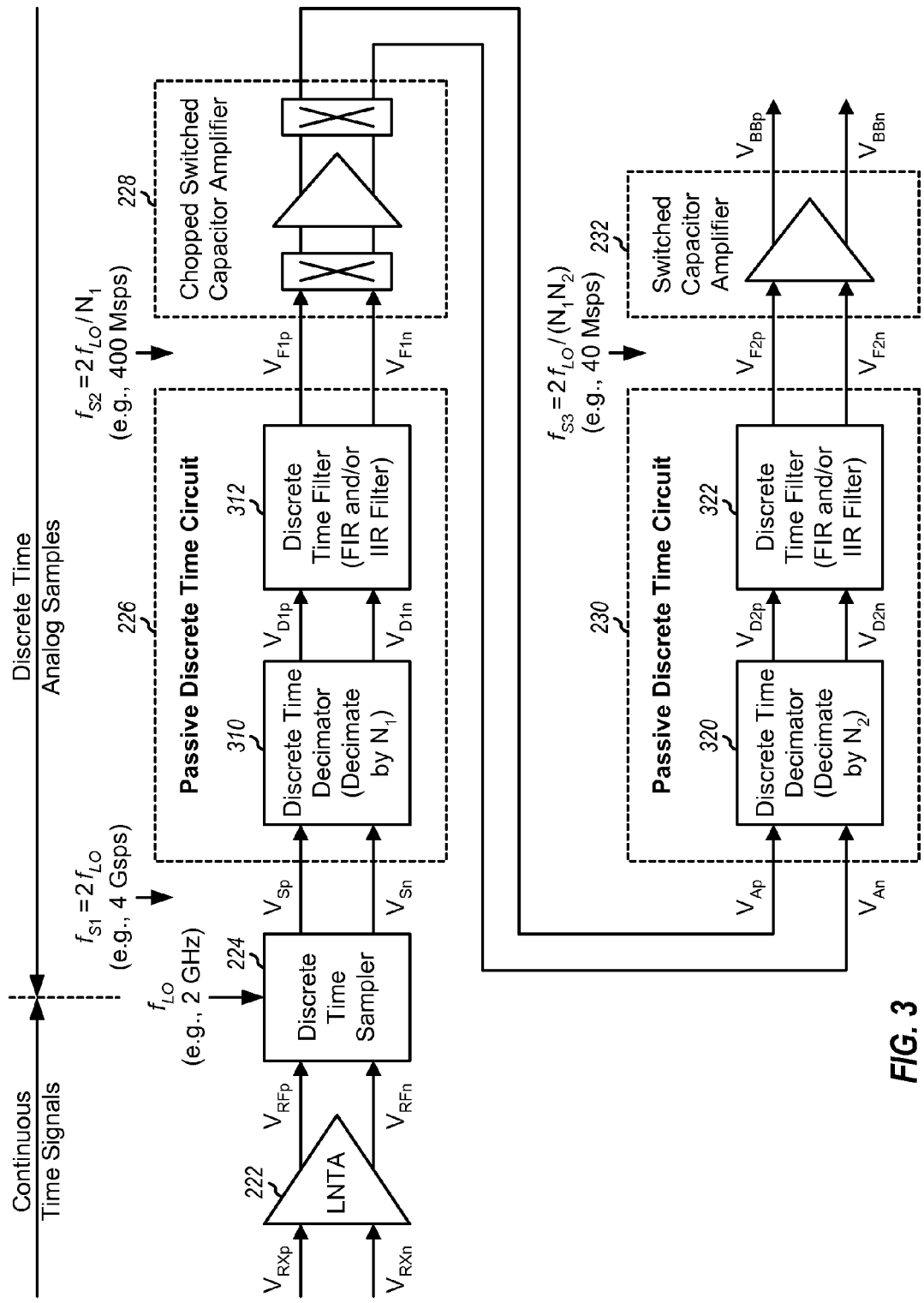
FIG. 3 shows a block diagram of the discrete time receiver.

FIG. 3 shows a block diagram of a differential design of discrete time sampler 224 through discrete time amplifier 232 for one signal path, which may be either the I path or the Q path in FIG. 2. In this design, LNTA 222 amplifies a differential received RF signal composed of $V_{RXp}$ and $V_{RXn}$ signals and provides a differential amplified RF signal composed of $V_{RFp}$ and $V_{RFn}$ signals. Discrete time sampler 224 samples the differential amplified RF signal with a sampling clock and provides input analog samples via $V_{Sp}$ and $V_{Sn}$ signals. Passive discrete time circuit 226 includes a discrete time decimator 310 and a discrete time filter 312. Decimator 310 decimates the input analog samples from sampler 224 by a factor of $N_1$ and provides first decimated analog samples via $V_{D1p}$ and $V_{D1n}$ signals. Discrete time filter 312 filters the first decimated analog samples and provides first filtered analog samples via $V_{F1p}$ and $V_{F1n}$ signals. Discrete time filter 312 may comprise a discrete time finite impulse response (FIR) filter and/or a discrete time infinite impulse response (IIR) filter. Discrete time filter 312 filters out blockers (which are large amplitude undesired signals) prior to discrete time amplifier 228 in order to simplify the design of the amplifier.

In the design shown in FIG. 3, discrete time amplifier 228 is implemented with a chopped switched capacitor amplifier that amplifies the first filtered analog samples and provides amplified analog samples via $V_{Ap}$ and $V_{An}$ signals. Passive discrete time circuit 230 includes a discrete time decimator 320 and a discrete time filter 322. Decimator 320 decimates the amplified analog samples by a factor of $N_2$ and provides second decimated analog samples via $V_{D2p}$ and $V_{D2n}$ signals. Discrete time filter 322 filters the second decimated analog samples and provides second filtered analog samples via $V_{F2p}$ and $V_{F2n}$ signals. Discrete time filter 322 is a low power adaptive filter that can meet specifications with lower power than continuous time designs. Discrete time amplifier 232 is implemented with a switched capacitor amplifier that amplifies the second filtered analog samples and provides baseband analog samples via $V_{BBp}$ and $V_{BBn}$ signals.

In one design, discrete time sampler 224 samples the amplified RF signal with two phases of the sampling clock at a rate of $f_{LO}$ and provides input analog samples at a rate of $f_{S1}=2f_{LO}$. Passive discrete time circuit 226 decimates the input analog samples by a factor of $N_1$ and provides first filtered analog samples at a rate of $f_{S2}=2f_{LO}/N_1$. Discrete time circuit 230 decimates the amplified analog samples by a factor of $N_2$ and provides second filtered analog samples at a rate of $f_{S3}=2f_{LO}/(N_1 \cdot N_2)$. The sampling clock rate $f_{LO}$ and the decimation factors $N_1$ and $N_2$ may be fixed or configurable values and may be selected based on system requirements. Different values may be used for $f_{LO}$, $N_1$ and/or $N_2$ for different systems, different radio technologies, different frequency bands, different system bandwidths, etc. In the example shown in FIG. 3, $f_{LO}=2$ giga-Hertz (GHz), $f_{S1}=4$ giga-samples/second (Gsps), $N_1=10$, $f_{S2}=400$ mega-samples/second (Msps), $N_2=10$, and $f_{S3}=40$ Msps. Other sample rates and decimation factors may also be used.

In one design, the sampling clock rate $f_{LO}$ may be set based on (e.g., equal to) the center frequency of a signal being received. Decimation factor $N_1$ and/or $N_2$ may be set based on the bandwidth of the signal being received and/or other factors. In one design, decimation factor $N_1$ is fixed, and decimation factor $N_2$ may be varied based on the desired signal bandwidth.

In the design shown in FIG. 3, each passive discrete time circuit includes a discrete time decimator followed by a discrete time filter. The discrete time decimator may perform anti-alias filtering prior to decimation. In another design, each passive discrete time circuit may include a discrete time filter followed by a discrete time decimator. In this design, the discrete time filter may perform anti-alias filtering. In yet another design, decimation and filtering are combined and performed by a decimating discrete time filter.

The circuit blocks in FIG. 3 may be implemented in various manners. Some exemplary designs of these circuit blocks are described below.

Figure 4:
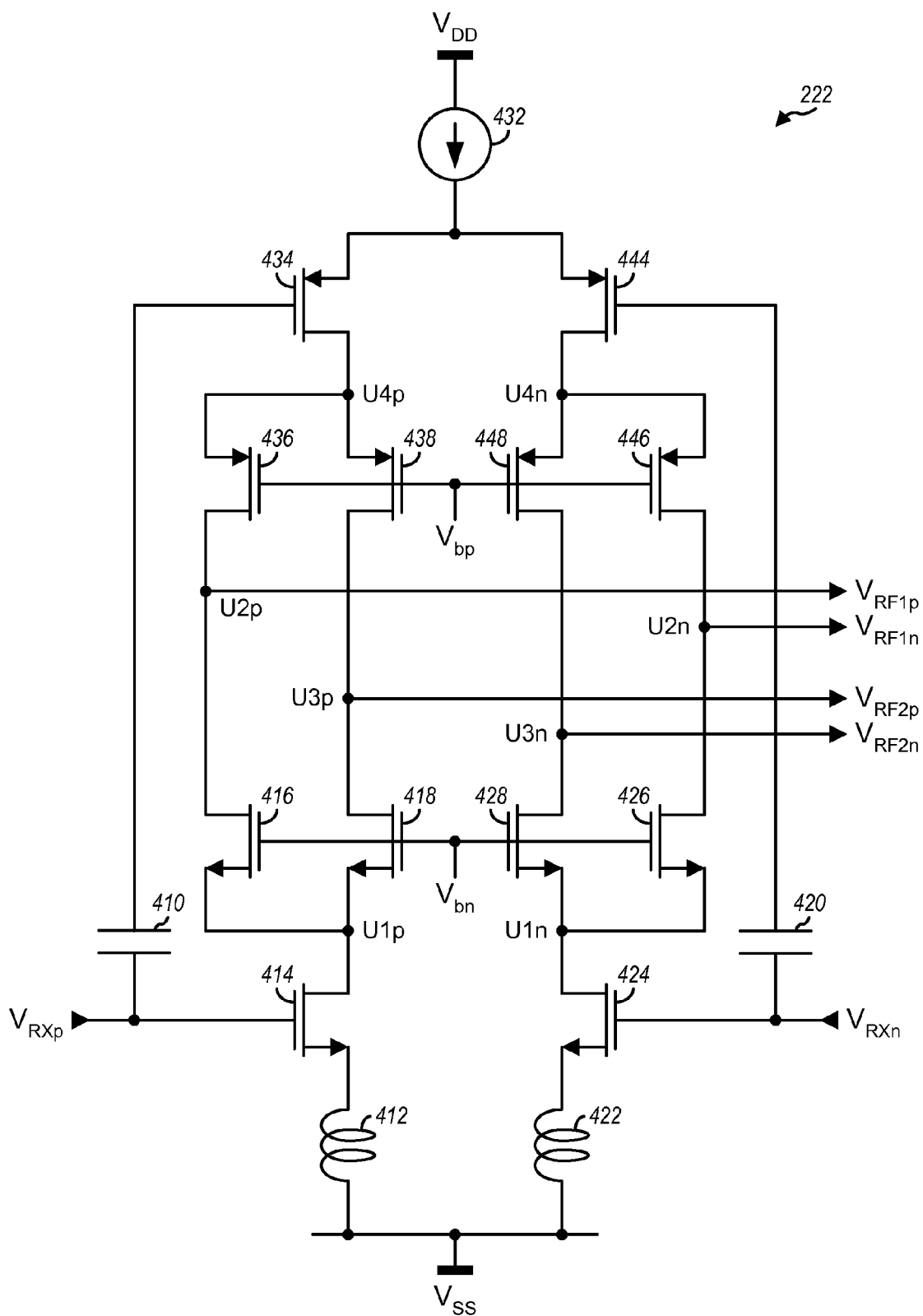
FIG. 4 shows a schematic diagram of an LNTA.

FIG. 4 shows a schematic diagram of a design of LNTA 222 in FIGS. 2 and 3.

Within LNTA 222, N-channel metal oxide semiconductor (NMOS) transistors 414 and 424 have their gates receiving the $V_{RXp}$ and $V_{RXn}$ signals, their drains coupled to nodes U1p and U1n, and their sources coupled to one end of inductors 412 and 422, respectively. The other end of inductors 412 and 422 is coupled to a lower supply voltage, $V_{SS}$. NMOS transistors 416 and 418 have their gates receiving a $V_{bn}$ bias voltage, their sources coupled to node U1p, and their drains coupled to nodes U2p and U3p, respectively. NMOS transistors 426 and 428 have their gates receiving the $V_{bn}$ bias voltage, their sources coupled to node U1n, and their drains coupled to nodes U2n and U3n, respectively.

P-channel MOS (PMOS) transistors 436 and 438 have their gates receiving a $V_{bp}$ bias voltage, their sources coupled to node U4p, and their drains coupled to nodes U2p and U3p, respectively. PMOS transistors 446 and 448 have their gates receiving the $V_{bp}$ bias voltage, their sources coupled to node U4n, and their drains coupled to nodes U2n and U3n, respectively. PMOS transistors 434 and 444 have their gates receiving the $V_{RXp}$ and $V_{RXn}$ signals via AC coupling capacitors 410 and 420, their sources coupled to a current source 432, and their drains coupled to nodes U4p and U4n, respectively. The other end of current source 432 is coupled to an upper supply voltage, $V_{DD}$. Nodes U2p and U2n provide a first differential amplified RF signal composed of $V_{RFp1}$ and $V_{RFn1}$ signals, which may be provided to discrete time sampler 224a in the I path in FIG. 2. Nodes U3p and U3n provide a second differential amplified RF signal composed of $V_{RFp2}$ and $V_{RFn2}$ signals, which may be provided to discrete time sampler 224b in the Q path.

NMOS transistors 414 and 424 and PMOS 434 and 444 form an input gain stage for LNTA 222. Inductors 412 and 422 are source degeneration inductors that provide a low noise input impedance match. NMOS transistors 416, 418, 426 and 428 and PMOS transistors 436, 438, 446 and 448 are coupled in cascode and provide signal drive for the $V_{RFp1}$, $V_{RFn1}$, $V_{RFp2}$ and $V_{RFn2}$ signals. Current source 432 provides a bias current for the NMOS and PMOS transistors.

Differential LNTA 222 in FIG. 4 may provide certain advantages over a single-ended LNTA. Differential LNTA 222 may provide improved cross-modulation performance, reliable input impedance matching, rejection of interference coupled via the power supplies, etc. The use of NMOS and PMOS transistors for the input gain stage increases the transconductance of LNTA 222 for a given bias current. The output impedance is increased by use of cascoding. LNTA 222 has low power but high output impedance and can maintain overall signal gain, provide good noise figure, and achieve a high third-order intercept point (IP3) through a low impedance load. Although not shown in FIG. 4, a common mode amplifier may be used to generate the $V_{SS}$ supply voltage and to control an output common mode voltage for the $V_{RFp1}$, $V_{RFn1}$, $V_{RFp2}$ and $V_{RFn2}$ signals.

Figure 5:
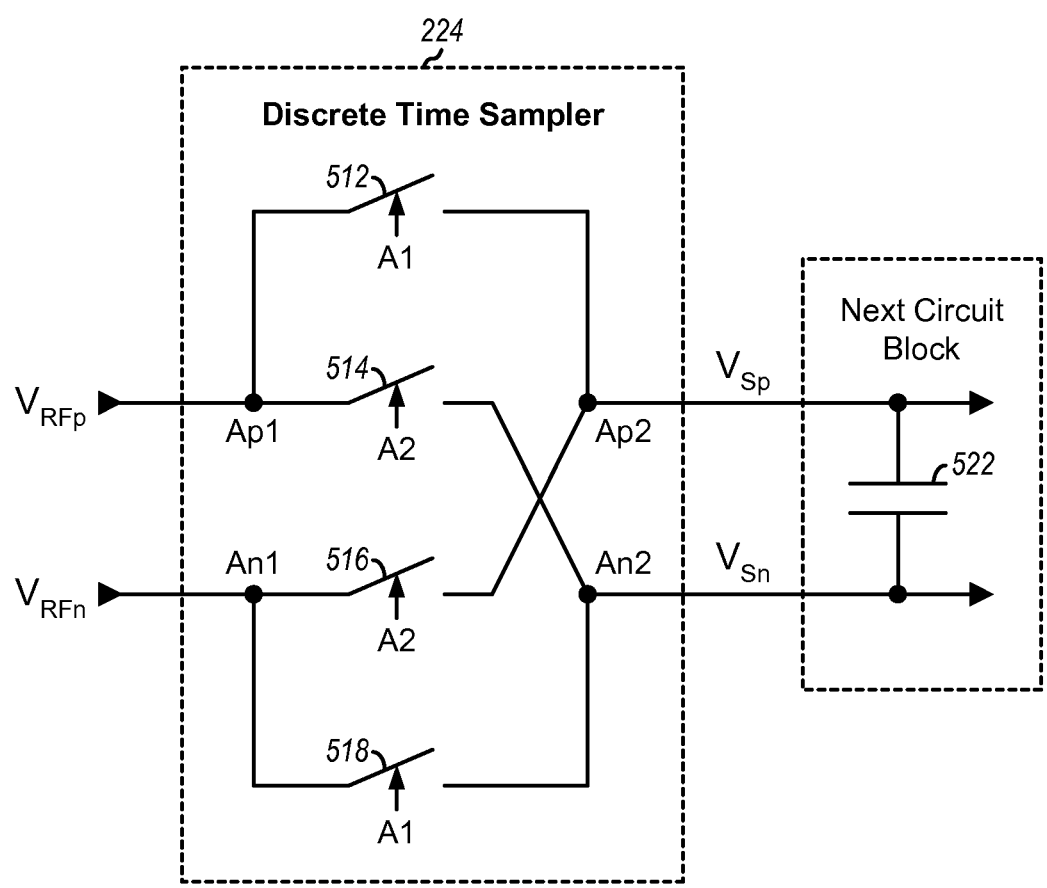
FIG. 5 shows a schematic diagram of a discrete time sampler.

FIG. 5 shows a schematic diagram of a design of discrete time sampler 224 in FIG. 3. Within sampler 224, a switch 512 is coupled between a first input Ap1 and a first output Ap2, a switch 514 is coupled between the first input Ap1 and a second output An2, a switch 516 is coupled between a second input An1 and the first output Ap2, and a switch 518 is coupled between the second input An1 and the second output An2. Switches 512 to 518 may be implemented with MOS transistors and/or other types of transistors. Switches 512 and 518 are controlled by an A1 control signal, which may be equal to the sampling clock provided to sampler 224. Switches 514 and 516 are controlled by an A2 control signal, which may be equal to an inverted version of the sampling clock. The first and second inputs Ap1 and An1 receive the $V_{RFp}$ and $V_{RFn}$ signals, respectively, which may be the $V_{RF1p}$ and $V_{RF1n}$ signals or the $V_{RF2p}$ and $V_{RF2n}$ signals from LNTA 222 in FIG. 4. The first and second outputs Ap2 and An2 provide the $V_{Sp}$ and $V_{Sn}$ signals, respectively, which may observe a capacitor 522 in the next circuit block as the output load for sampler 224.

Sampler 224 operates as follows. During a first phase of the sampling clock, the A1 signal is enabled, switches 512 and 518 are closed, switches 514 and 516 are opened, and the $V_{RFp}$ and $V_{RFn}$ signals charge the top and bottom plates of capacitor 522. During a second phase of the sampling clock, the A2 signal is enabled, switches 514 and 516 are closed, switches 512 and 518 are opened, and the $V_{RFp}$ and $V_{RFn}$ signals charge the opposite plates of capacitor 522. The double sampling with the A1 and A2 signals effectively doubles the sampling rate.

The double sampling by discrete time sampler 224 may provide certain advantages. First, approximately twice the amount of energy may be collected by sampling each of the $V_{RFp}$ and $V_{RFn}$ signals with two sampling phases instead of just one sampling phase. This may result in less insertion loss.

Second, LNTA 222 observes an almost constant output load with double sampling, which may improve performance.

Figure 6:
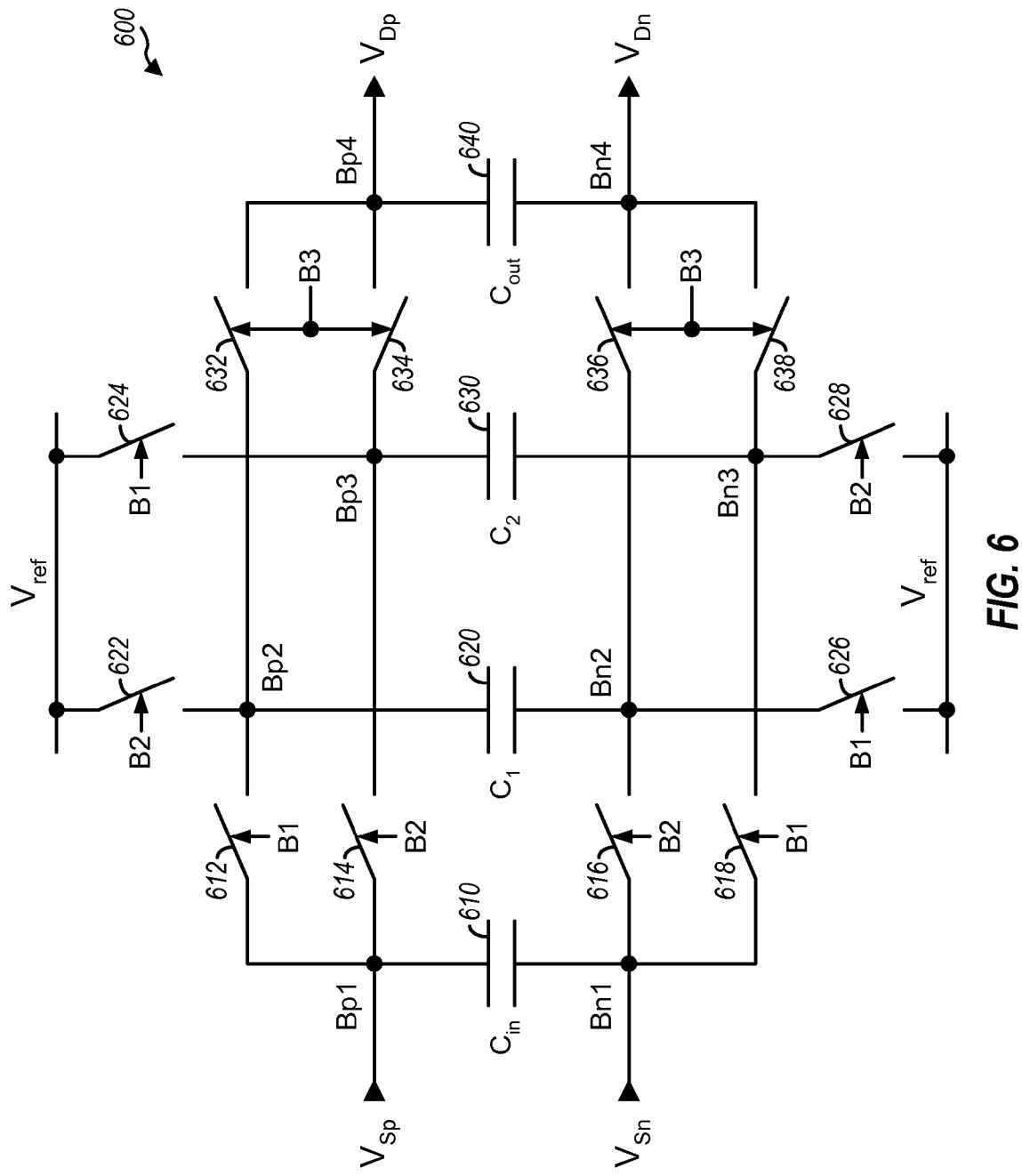
FIG. 6 shows a schematic diagram of a discrete time decimator.

FIG. 6 shows a schematic diagram of a design of a discrete time decimator 600, which may be used for each of decimators 310 and 320 in FIG. 3. Within decimator 600, an input capacitor 610 is coupled between nodes Bp1 and Bn1. Switches 612 and 614 have one end coupled to node Bp1 and the other end coupled to nodes Bp2 and Bp3, respectively. Switches 616 and 618 have one end coupled to node Bn1 and the other end coupled to nodes Bn2 and Bn3, respectively. Switches 622 and 624 have one end coupled to a reference voltage, $V_{ref}$, and the other end coupled to nodes Bp2 and Bp3, respectively. A sampling capacitor 620 is coupled between nodes Bp2 and Bn2, and a sampling capacitor 630 is coupled between nodes Bp3 and Bn3. Switches 626 and 628 have one end coupled to $V_{ref}$ and the other end coupled to nodes Bn2 and Bn3, respectively. Switches 632 and 634 have one end coupled to node Bp4 and the other end coupled to nodes Bp2 and Bp3, respectively. Switches 636 and 638 have one end coupled to node Bn4 and the other end coupled to nodes Bn2 and Bn3, respectively. An output capacitor 640 is coupled between nodes Bp4 and Bn4. Switches 612, 618, 624 and 626 are controlled by a B1 control signal. Switches 614, 616, 622 and 628 are controlled by a B2 control signal. Switches 632, 634, 636 and 638 are controlled by a B3 control signal.

Capacitor 610 is an input capacitor and is coupled directly to the differential input signal. Capacitor 640 is an output capacitor and is coupled directly to the differential output signal. Input capacitor 610 and/or output capacitor 640 may be omitted for some designs. Capacitors 620 and 630 are sampling capacitors that sample the differential input signal and provide their stored charges to the differential output signal. The differential input of decimator 600 at nodes Bp1 and Bn1 receives the $V_{Sp}$ and $V_{Sn}$ signals from sampler 224 in FIG. 5. The differential output of decimator 600 at nodes Bp4 and Bn4 provides the $V_{Dp}$ and $V_{Dn}$ signals.

Decimator 600 has poles located at a frequency determined by the capacitance values of capacitors 610, 620, 630 and 640 as well as the decimation factor. The capacitance values of capacitors 610, 620, 630 and 640 may be selected based on various considerations such as the desired voltage swing, the desired frequency response, the capacitance to present to a preceding circuit, etc. Capacitors 620 and 630 may have the same capacitance. The capacitance of capacitor 640 may be smaller than the combined capacitance of capacitors 620 and 630 so that the voltage drop is not too great when capacitors 620 and 630 are coupled to the output.

Figure 7:
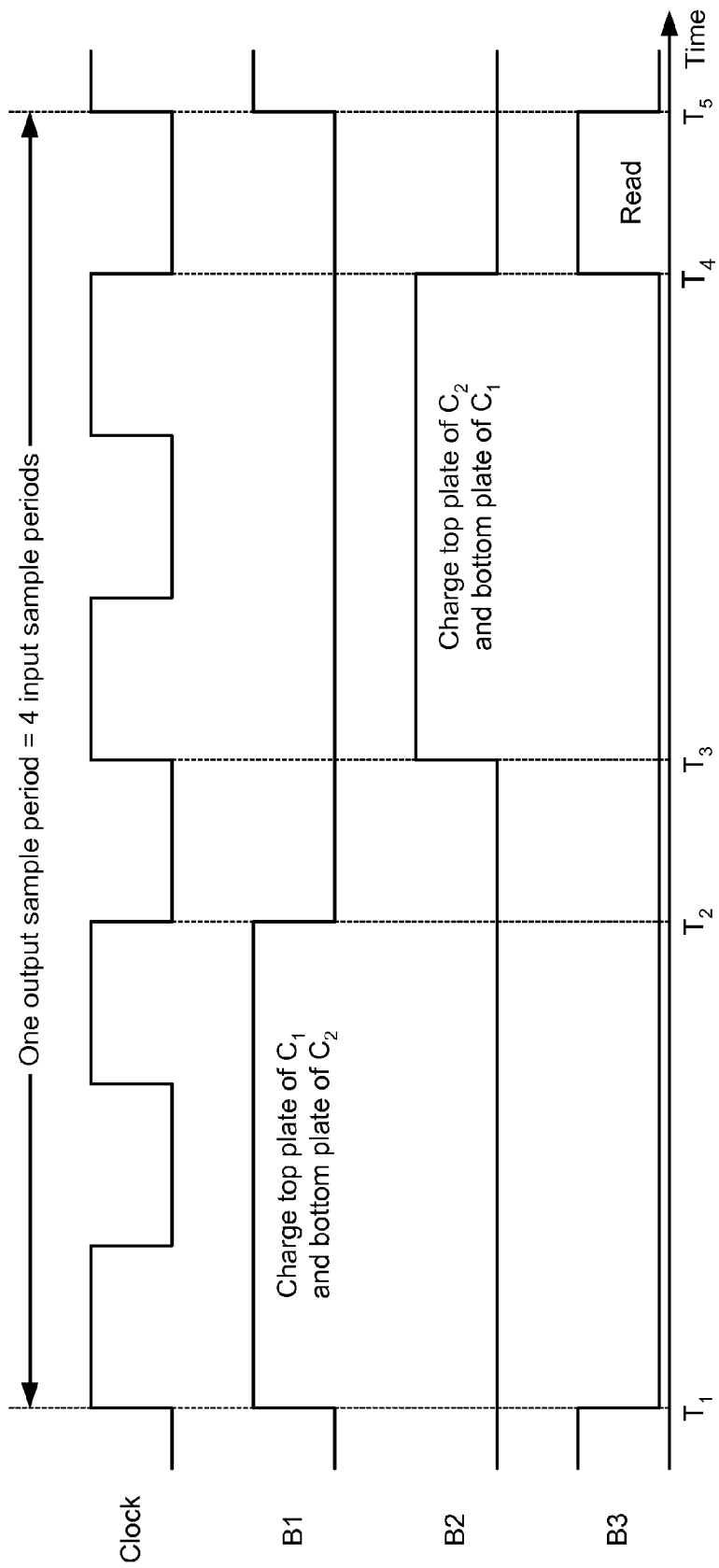
FIG. 7 shows a timing diagram for the discrete time decimator.

FIG. 7 shows a timing diagram of the control signals for decimator 600 in FIG. 6 with a decimation factor of four. The top plates of sampling capacitors 620 and 630 are charged during two charging phases and provide their stored charges during a reading phase. The bottom plates of sampling capacitors 620 and 630 are also charged during the two charging phases and provide their stored charges during the reading phase.

For the first charging phase from time $T_1$ to time $T_2$, the B1 signal is asserted, switches 612 and 626 are closed, and the top plate of capacitor 620 is charged by the $V_{Sp}$ signal. Switches 618 and 624 are also closed, and the bottom plate of capacitor 630 is charged by the $V_{Sn}$ signal. For the second charging phase from time $T_3$ to time $T_4$, the B2 signal is asserted, switches 614 and 628 are closed, and the top plate of capacitor 630 is charged by the $V_{Sp}$ signal. Switches 616 and 622 are also closed, and the bottom plate of capacitor 620 is charged by the $V_{Sn}$ signal. For the reading phase from time $T_4$ to time $T_5$, the B3 signal is asserted, switches 632, 634, 636 and 638 are closed, the top plates of capacitors 620 and 630 provide their stored charges to the $V_{Dp}$ signal, and the bottom plates of capacitors 620 and 630 provide their stored charges to the $V_{Dn}$ signal.

For the design shown in FIG. 7, the top plates of capacitors 620 and 630 are charged by the $V_{Sp}$ signal during two non-overlapping time intervals and provide their stored charges to the $V_{Dp}$ signal during a third non-overlapping time interval in each output sample period. Similarly, the bottom plates of capacitors 620 and 630 are charged by the $V_{Sn}$ signal during the two non-overlapping time intervals and provide their stored charges to the $V_{Dn}$ signal during the third non-overlapping time interval in each output sample period. For each capacitor, at most one plate is charged at any given moment. Each input signal alternately charges two capacitors 620 and 630 in two charging phases. These two capacitors may be able to collect more charges from the input signal over two charging phases, which may result in less insertion loss for decimator 600.

FIG. 7 shows an example timing diagram for a decimation factor of four. Other decimation factors may be supported by varying the duration of the charging phases for the B1 and B2 signals.

In another design, a twin bank switched capacitor decimator (TBSCD) may be implemented with two copies of decimator 600 in FIG. 6. For a decimation factor of N, the two sampling capacitors in the first copy of decimator 600 may be charged during the first N/2 clock cycles and may be read during the last N/2 clock cycles of each output sample period. The two sampling capacitors in the second copy of decimator 600 may be charged during the last N/2 clock cycles and may be read during the first N/2 clock cycles of each output sample period. This design may result in lower insertion loss since each input signal can charge four sampling capacitors in four charging phases having little or no gap.

Referring back to FIG. 3, discrete time filter 312 and/or 322 may comprise a discrete time FIR filter. The output samples y(n) from the discrete time FIR filter may be expressed as:

$$y(n) = \sum_{l=1}^{L} w_l \cdot x(n-l-1), \qquad \text{Eq (1)}$$

where x(n) is an input sample, $w_l$ is the weight for the l-th FIR filter tap, and L is the number of taps in the discrete time FIR filter. In equation (1), x(n−l−1) and not x(n−l) is used because tap index l starts at 1 instead of 0.

Figure 8:
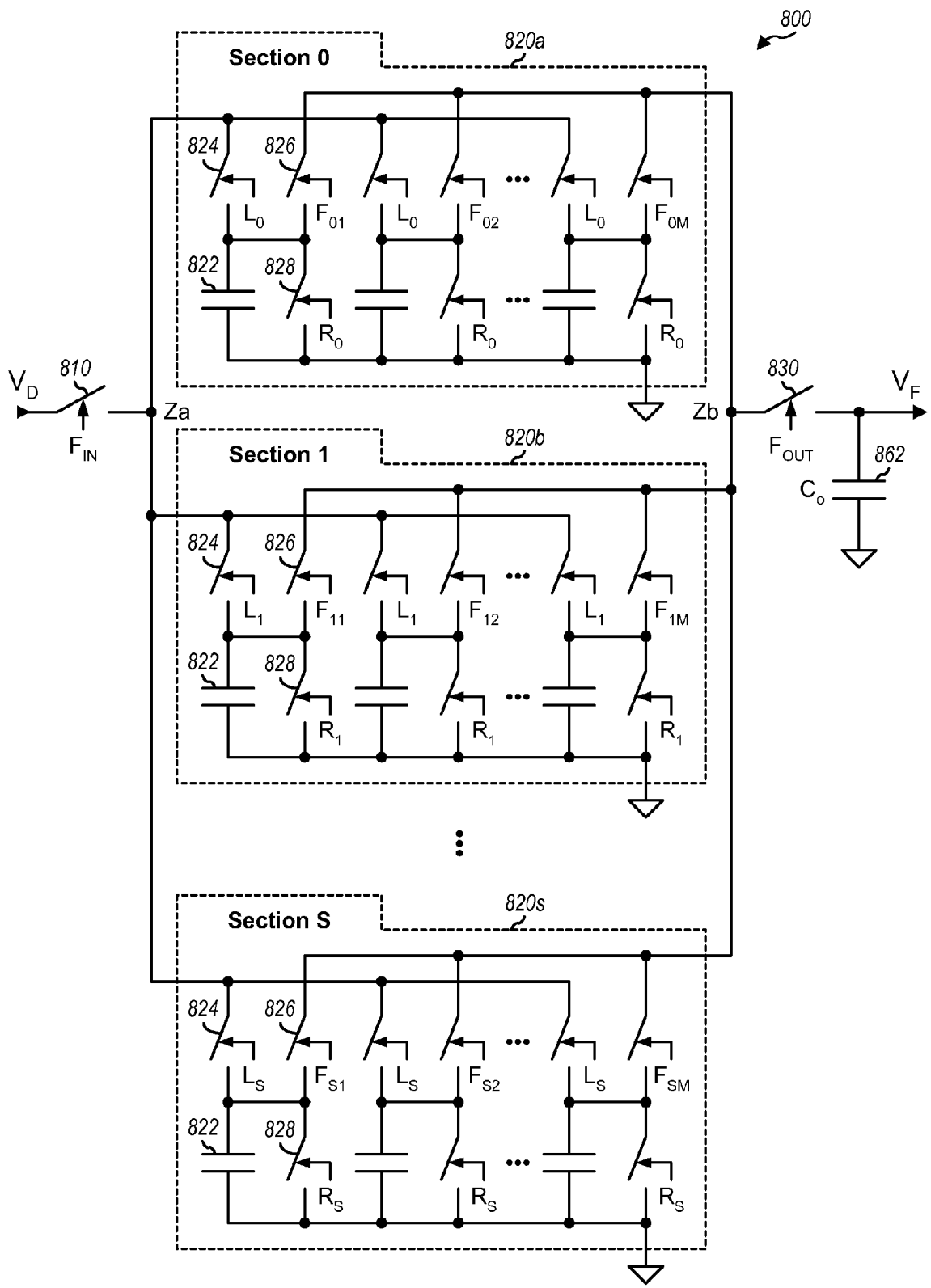
FIG. 8 shows a schematic diagram of a discrete time FIR filter.

FIG. 8 shows a schematic diagram of a design of a discrete time FIR filter 800, which may be used for each of discrete time filters 312 and 322 in FIG. 3. FIR filter 800 includes an input switch 810, S+1 filter sections 820a through 820s, and an output switch 830, where S may be a suitable integer value. Switch 810 has one end receiving a $V_D$ signal and the other end coupled to node Za. The $V_D$ signal may be the $V_{D1p}$ or $V_{D1n}$ signal from decimator 310 or the $V_{D2p}$ or $V_{D2n}$ signal from decimator 320 in FIG. 3. Switch 830 has one end coupled to node Zb and the other end providing a $V_F$ signal. The $V_F$ signal may be the $V_{F1p}$ or $V_{F1n}$ signal from filter 312 or the $V_{F2p}$ or $V_{F2n}$ signal from filter 322 in FIG. 3. Switch 810 is controlled by an $F_{IN}$ control signal, and switch 830 is controlled by an $F_{OUT}$ control signal.

Each section 820 has its input coupled to node Za and its output coupled to summing node Zb. Each section 820 includes M cells, where M may be a suitable integer value. Each cell includes a capacitor 822 and switches 824, 826 and 828. For clarity, the capacitor and switches for only one cell in each section is labeled in FIG. 8. For each cell, switch 824 is coupled between the section input (which is node Za) and the top plate of capacitor 822. The bottom plate of capacitor 822 may be coupled to circuit ground (as shown in FIG. 8) or a reference voltage. Switch 826 is coupled between the section output (which is node Zb) and the top plate of capacitor 822. Switch 828 is coupled across capacitor 822.

For each section s, where $s \in \{0, \ldots, S\}$, the M switches 824 are controlled by the same $L_s$ load signal, the M switches 828 are controlled by the same $R_s$ reset signal, and the M switches 826 are controlled by M different $F_{s1}$ through $F_{sM}$ select signals. The $L_s$ load signal controls the charging of the M capacitors in the section. The $R_s$ reset signal controls the resetting of the M capacitors in the section. The select signals control the coupling of the M capacitors in the section to summing node Zb. The S+1 sections 820a through 820s may have S+1 different load signals $L_0$ through $L_L$, respectively, and may also have S+1 different reset signals $R_0$ through $R_L$, respectively.

Figure 9:
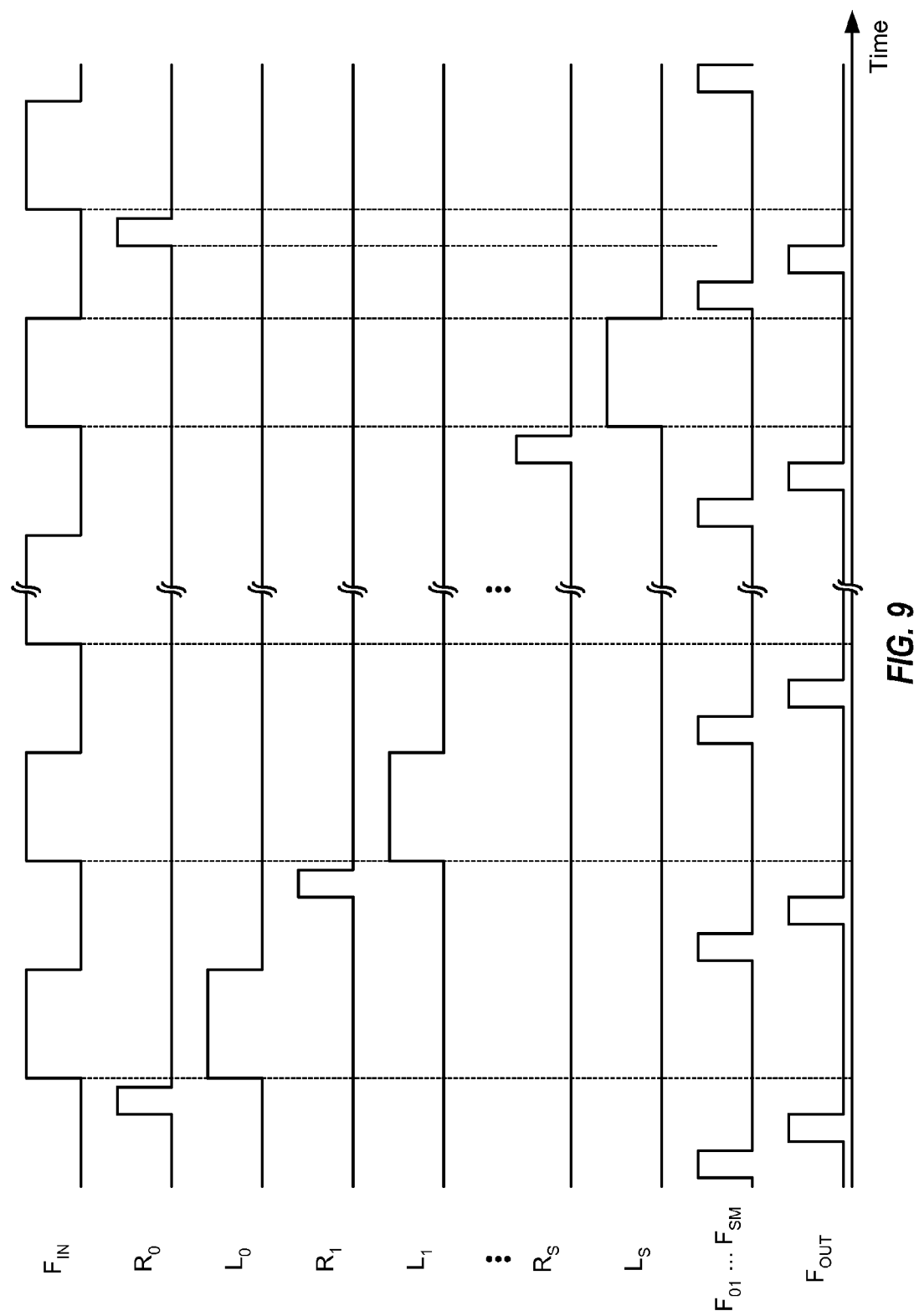
FIG. 9 shows a timing diagram for the discrete time FIR filter.

FIG. 9 shows a timing diagram of the control signals for FIR filter 800 in FIG. 8. The M capacitors in each section may be reset to a predetermined value prior to being charged by enabling the $R_s$ reset signal for that section. The M capacitors in each section may be charged by the $V_D$ signal by enabling the $L_s$ load signal for that section. The M capacitors in each section may transfer their charges to the summing node Zb based on the $F_{s1}$ through $F_{sM}$ select signals, which may be generated in different manners for different filter modes.

FIR filter 800 may be operated as a decimating rectangular FIR filter, a non-decimating rectangular FIR filter, a decimating weighted FIR filter, or a non-decimating weighted FIR filter by generating appropriate control signals for the switches in FIR filter 800. Table 1 provides a short description for each filter mode.

TABLE 1

| Filter Mode | Input Sample Rate | Output Sample Rate | Filter Weights | Frequency Response |
|---|---|---|---|---|
| Decimating rectangular | $f_S$ | $f_S/K$ | Equal weights $w_1 = w_2 = \ldots = w_L$ | sin x/x |
| Non-decimating rectangular | $f_S$ | $f_S$ | Equal weights $w_1 = w_2 = \ldots = w_L$ | sin x/x |
| Decimating weighted | $f_S$ | $f_S/K$ | Different weights $w_1, w_2, \ldots, w_L$ | Determined by the weights |
| Non-decimating weighted | $f_S$ | $f_S$ | Different weights $w_1, w_2, \ldots, w_L$ | Determined by the weights |

FIR filter 800 may implement a non-decimating rectangular FIR filter with L+1 sections and L capacitors per section, so that S=M=L. The $V_D$ signal charges all L capacitors in one section in each clock cycle. The L+1 sections are charged in a round robin manner in L+1 clock cycles, one section per clock cycle. In each clock cycle, the L sections that are not being charged provide their stored charges to summing node Zb, one capacitor per section. The charges from L capacitors in the L sections are summed to generate an output sample for the clock cycle. For each section, the L capacitors are charged to the same value in one clock cycle, and the charges from the L capacitors are provided to the summing node in L clock cycles, one capacitor per clock cycle. This allows one output sample to be generated in each clock cycle.

FIR filter 800 may implement a decimating weighted FIR filter with L sections and M capacitors per section, so that S+1=L. The L sections implement L weights for the FIR filter. The $V_D$ signal charges all M capacitors in one section in each clock cycle. The L sections are charged in a round robin manner in L clock cycles, one section per clock cycle. For each section, all M capacitors are initially charged to the same value when the section is charged, all or a subset of the M capacitors may be used based on the weight for that section, and the unused capacitors are discharged by closing the associated reset switches. After all L sections have been charged in L clock cycles, the charges from all capacitors in the L sections are summed to generate one output sample. One output sample is thus generated in every L clock cycles, and the decimation rate is K=L. M unit capacitors may be used in each section to obtain a weight with granularity of 1/M.

FIR filter 800 may implement a decimating rectangular FIR filter in similar manner as a decimating weighted FIR filter, albeit with M=1. FIR filter 800 may implement a non-decimating weighted FIR filter in similar manner as a non-decimating rectangular FIR filter, albeit with each capacitor in FIG. 8 being replaced with a set of capacitors that may be selected to obtain a desired weight. In general, a filter may be implemented with a single-ended design or a differential design. The capacitors in the filter may be oriented to achieve good performance (e.g., to avoid bottom plate capacitor non-linearity) and may be charged with common mode voltage (e.g., as shown in FIG. 6).

Referring back to FIG. 3, discrete time filter 312 and/or 322 may comprise a discrete time IIR filter. The output samples y(n) from the discrete time IIR filter may be expressed as:

$$y(n) = c_0 \cdot x(n) - \sum_{l=1}^{L} c_l \cdot y(n-l), \qquad \text{Eq (2)}$$

where $c_l$ is the weight for the l-th IIR filter tap.

Figure 10:
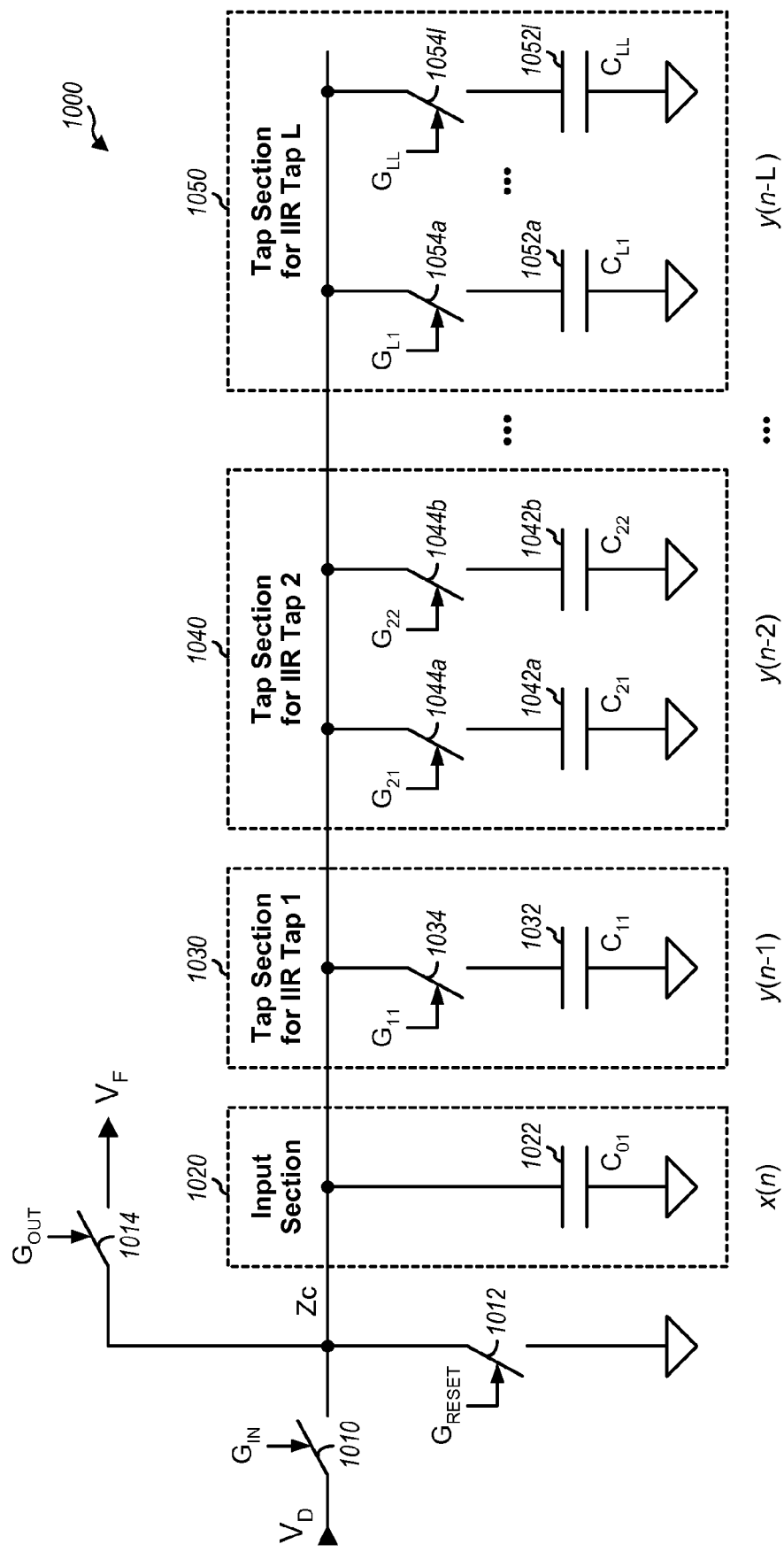
FIG. 10 shows a schematic diagram of a discrete time IIR filter.

FIG. 10 shows a schematic diagram of a design of a discrete time IIR filter 1000, which may be used for each of discrete time filters 312 and 322 in FIG. 3. IIR filter 1000 includes an input section 1020 and L IIR tap sections 1030 through 1050. Within IIR filter 1000, an input switch 1010 has one end receiving the $V_D$ signal and the other end coupled to a summing node Zc. A reset switch 1012 is coupled between node Zc and circuit ground. An output switch 1014 has one end coupled to node Zc and the other end providing the $V_F$ signal. Switch 1010 is controlled by a $G_{IN}$ control signal, switch 1012 is controlled by a $G_{RESET}$ reset signal, and switch 1014 is controlled by a $G_{OUT}$ control signal.

Input section 1020 includes a capacitor 1022 coupled between node Zc and circuit ground. First IIR tap section 1030 includes a switch 1034 coupled in series with a capacitor 1032, the combination of which is coupled between node Zc and circuit ground. Second IIR tap section 1040 includes two switches 1044a and 1044b coupled in series with two capacitors 1042a and 1042b, respectively. Both series combinations of switch 1044 and capacitor 1042 are coupled between node Zc and circuit ground. Each remaining IIR tap section is implemented in similar manner. L-th IIR tap section 1050 includes L switches 1054a and 1054l coupled in series with L capacitors 1052a and 1052l, respectively. The L series combinations of switch 1054 and capacitor 1052 are coupled between node Zc and circuit ground. The first capacitor in each IIR tap section (e.g., capacitors 1032, 1042a, . . . , 1052a) may be reset at the start of filtering operation.

In one design, all capacitors in each IIR tap section have the same capacitance, which is determined by the corresponding IIR filter coefficient. A negative capacitor for a negative coefficient may be obtained by switching the polarity of the capacitor between a read phase and a charge sharing phase.

In general, the number of capacitors to use for each IIR tap section is determined by the delay for that IIR tap. For the l-th IIR tap section, where l ∈ {1, ..., L}, l capacitors of the same size may be used for the IIR tap section. In each clock cycle, one capacitor that was charged l clock cycles earlier and storing y(n−l) may be used to generate y(n) for the current clock cycle, and this capacitor may store y(n) for use to generate y(n+l) l clock cycles later. The l capacitors may be charged in a sequential order, one capacitor in each clock cycle, and may store samples y(n−1) through y(n−l) in any given clock cycle n.

Figure 11:
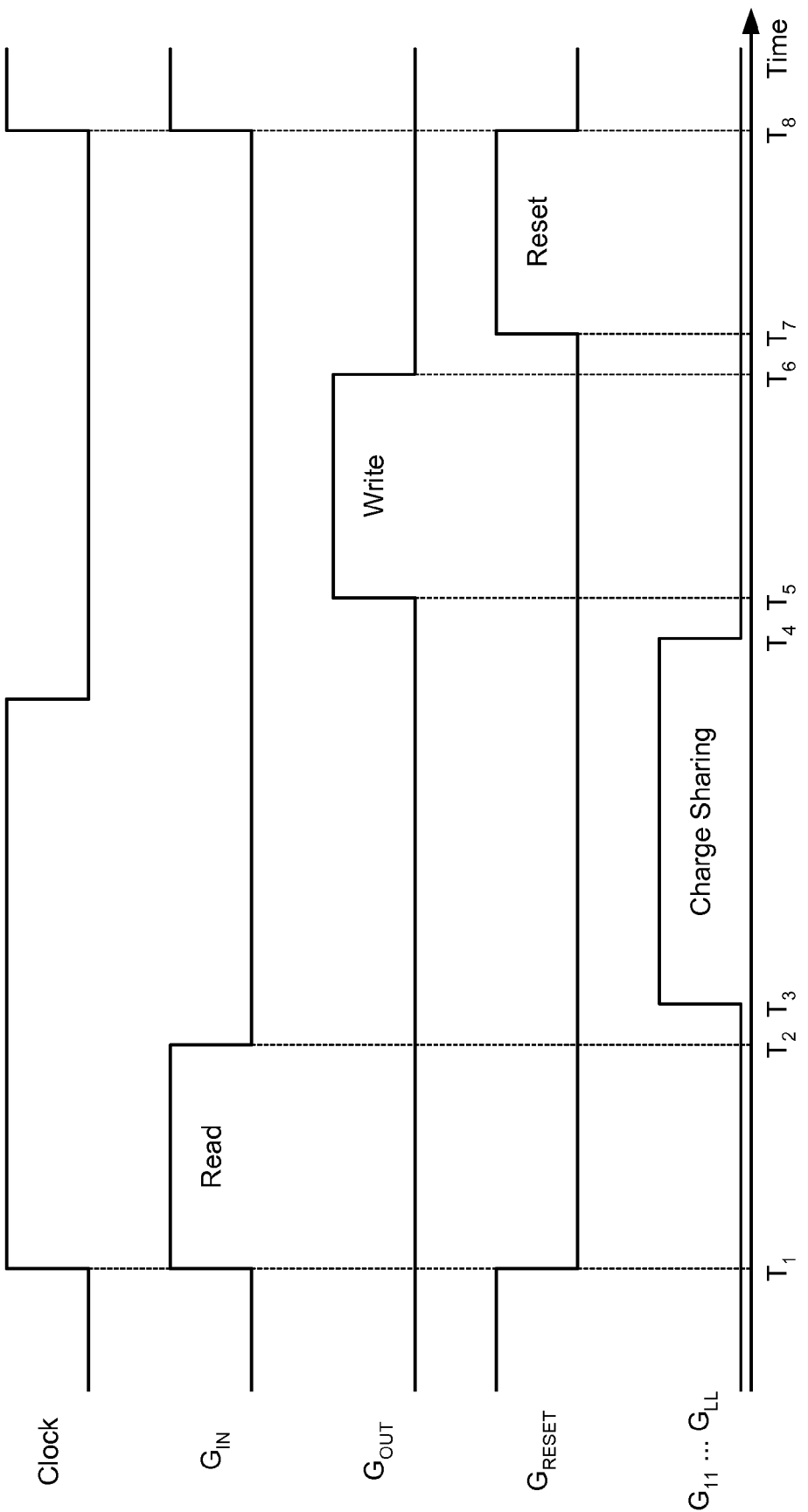
FIG. 11 shows a timing diagram for the discrete time IIR filter.

FIG. 11 shows a timing diagram of the control signals for discrete time IIR filter 1000 in FIG. 10. A clock signal for IIR filter 1000 is shown at the top of the timing diagram. Control signals for the switches within IIR filter 1000 are shown below the clock signal.

In the design shown in FIG. 11, each clock cycle includes a read phase, a charge sharing phase, a write phase, and a reset phase. For the read phase from time $T_1$ to time $T_2$, the $G_{IN}$ control signal is asserted, switch 1010 is closed, and input capacitor 1022 is charged with the $V_D$ signal. For the charge sharing phase from time $T_3$ to time $T_4$, the $G_{Ij}$ control signal for each capacitor selected for charge sharing is asserted, and L selected capacitors in the L IIR tap sections as well as input capacitor 1022 perform charge sharing via the summing node Zc. At the end of the charge sharing phase, the $G_{Ij}$ control signal for each selected capacitor is de-asserted at time $T_4$, which then causes that capacitor to store y(n). For the write phase from time $T_5$ to time $T_6$, the $G_{OUT}$ control signal is asserted, switch 1014 is closed, and capacitor 1022 provides y(n) to the $V_F$ signal. For the reset phase from time $T_7$ to time $T_8$, the $G_{RESET}$ control signal is asserted, switch 1012 is closed, and capacitor 1022 is reset.

Referring back to FIG. 3, discrete time amplifier 228 may provide voltage amplification, behave as a capacitive buffer with a small input capacitance and a large output capacitance, and provide signal drive. Discrete time sampler 224, discrete time decimator 310, and discrete time filter 312 are passive circuits and have insertion loss. Discrete time amplifier 228 can increase the available charge and provide signal drive for discrete time decimator 320 and discrete time filter 322, which are also passive circuits. In the design shown in FIG. 3, discrete time amplifier 228 is implemented with a chopped switched capacitor amplifier that can reduce 1/f flicker noise, provide good noise performance, and also provide a low input capacitance that can support overall signal gain.

Figure 12:
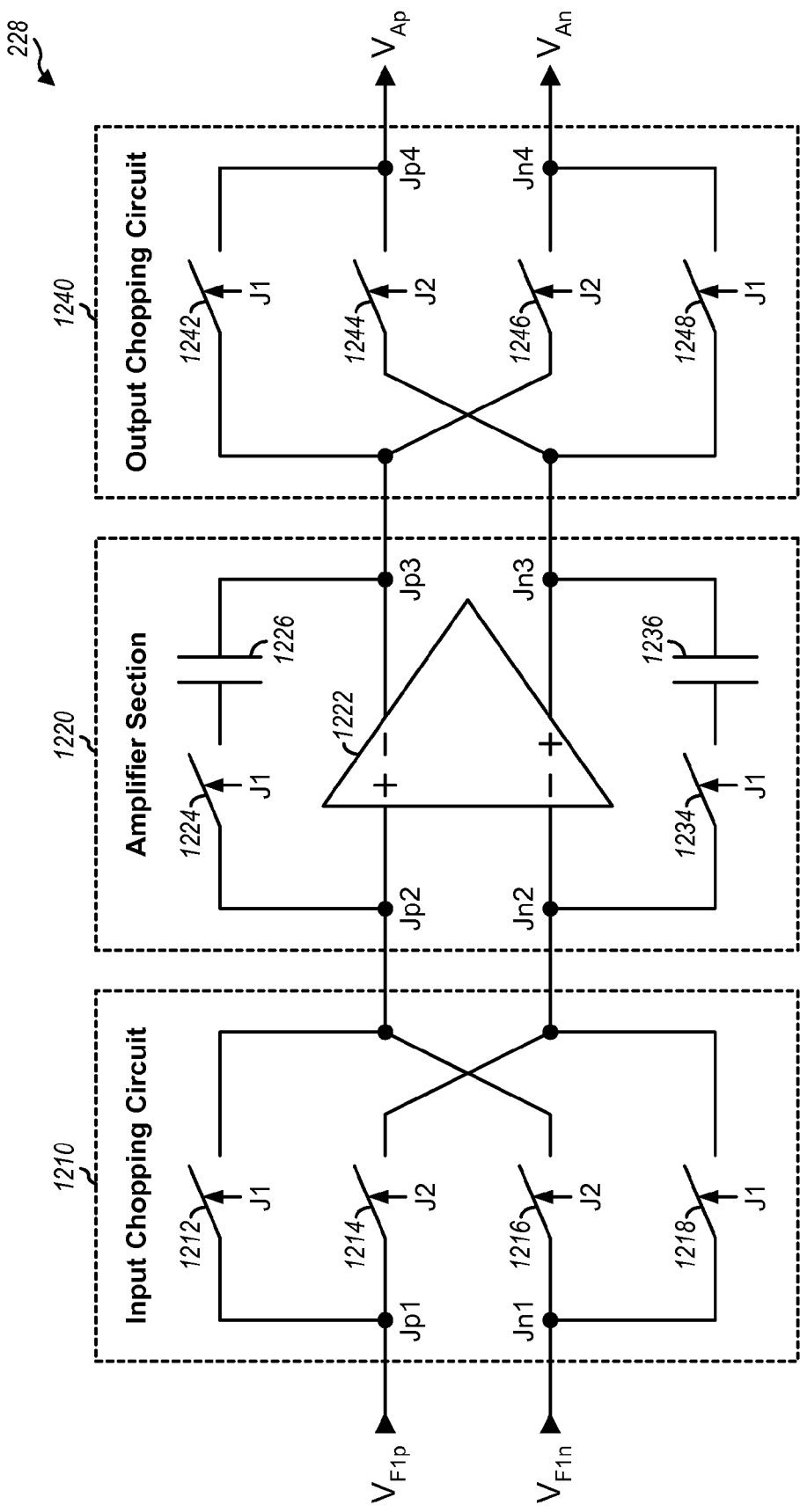
FIG. 12 shows a schematic diagram of a chopped switched capacitor amplifier.

FIG. 12 shows a schematic diagram of a design of chopped switched capacitor amplifier 228. In this design, amplifier 228 includes an input chopping circuit 1210, an amplifier section 1220, and an output chopping circuit 1240. Within input chopping circuit 1210, a switch 1212 is coupled between nodes Jp1 and Jp2, a switch 1214 is coupled between nodes Jp1 and Jn2, a switch 1216 is coupled between nodes Jn1 and Jp2, and a switch 1218 is coupled between nodes Jn1 and Jn2. Switches 1212 and 1218 are controlled by a J1 control signal, which may be equal to a chopping clock provided to amplifier 228. Switches 1214 and 1216 are controlled by a J2 control signal, which may be equal to an inverted version of the chopping clock. The differential input of amplifier 228 at nodes Jp1 and Jn1 receives the $V_{F1p}$ and $V_{F1n}$ signals from discrete time filter 312 in FIG. 3.

Within amplifier section 1222, an amplifier 1222 has its non-inverting and inverting inputs coupled to nodes Jp2 and Jn2, respectively, and its inverting and non-inverting outputs coupled to nodes Jp3 and Jn3, respectively. A switch 1224 and a capacitor 1226 are coupled in series, and the combination is coupled between the non-inverting input and the inverting output of amplifier 1222. A switch 1234 and a capacitor 1236 are coupled in series, and the combination is coupled between the inverting input and the non-inverting output of amplifier 1222. Although not shown in FIG. 12 for simplicity, a set of switches may be used to reset the input common mode voltage of amplifier 1222 between samples (i.e., when the J1 and J2 signals are simultaneously at logic low.

Within output chopping circuit 1240, a switch 1242 is coupled between nodes Jp3 and Jp4, a switch 1244 is coupled between nodes Jn3 and Jp4, a switch 1246 is coupled between nodes Jp3 and Jn4, and a switch 1248 is coupled between nodes Jn3 and Jn4. Switches 1242 and 1248 are controlled by the J1 signal, and switches 1244 and 1246 are controlled by the J2 signal. The differential output of amplifier 228 at nodes Jp4 and Jn4 provides the $V_{Ap}$ and $V_{An}$ signals to discrete time decimator 320 in FIG. 3.

Amplifier 228 operates as follows. Input chopping circuit 1210 alternately provides the $V_{F1p}$ signal to nodes Jp2 and Jn2 on alternate phases of the chopping clock and also alternately provides the $V_{F1n}$ signal to nodes Jp2 and Jn2 on the alternate phases of the chopping clock, as described above for FIG. 5. This results in chopping of the input signal, which upconverts the desired signal component to the chopping clock frequency. The desired signal component is thus minimally affected by low frequency flicker noise of amplifier 1222. Amplifier 1222 provides voltage gain, with the gain being dependent on the ratio of capacitors 1226 and 1236 to input capacitors (not shown in FIG. 12). Output chopping circuit 1240 operates in similar manner as input chopping circuit 1210. Output chopping circuit 1240 alternately provides the signal at node Jp3 to nodes Jp4 and Jn4 on alternate phases of the chopping clock and also alternately provides the signal at node Jn3 to nodes Jp4 and Jn4 on the alternate phases of the chopping clock. This results in chopping of the output signal, which downconverts the desired signal component to baseband and moves the flicker noise to the chopping clock frequency. The chopping action by both the input and output chopping circuits may downconvert noise and undesired signal components near the chopping clock frequency to baseband. Discrete time filter 312 may attenuate the noise and undesired signal components near the chopping clock frequency prior to chopping amplifier 228.

Amplifier 228 may also be implemented with a switched capacitor amplifier or some other type of amplifier. Amplifier 232 in FIG. 3 may be implemented with a switched capacitor amplifier (as shown in FIG. 3), a chopped switched capacitor amplifier (as shown in FIG. 12), or some other type of amplifier.

Example designs of LNTA 222, discrete time sampler 224, discrete time decimator 600, discrete time FIR filter 800, discrete time IIR filter 1000, and chopped switched capacitor amplifier 228 have been described above. These circuit blocks may be implemented with other designs. The circuit blocks may also be arranged differently than the configuration shown in FIG. 3. For example, passive discrete time circuits 226 and 230 in FIG. 3 may each be implemented with a discrete time decimator followed by a discrete time FIR filter, followed by another discrete time decimator, followed by a discrete time IIR filter, etc.

The discrete time receiver described herein can support different signal bandwidths, different center frequencies, etc. Discrete time sampler 224 may sample the amplified RF signal at a suitable sampling rate, which may be selected based on the center frequency and/or the bandwidth of a desired signal being received. The decimation factors $N_1$ and $N_2$ may be selected based on the sampling rate, the desired signal bandwidth, and/or other factors. ADCs 234 may digitize the baseband analog samples from amplifiers 232 based on an ADC clock at a suitable rate. The sample rates for discrete time decimators 310 and 320, discrete time filters 312 and 322, and ADC 234 may be selected based on the desired signal bandwidth and/or other factors. For example, discrete time decimator 320 may have a nominal decimation factor of $N_2$ for a 20 MHz signal bandwidth. The decimation factor $N_2$ may be increased by 2, 4, 8 or 16 for signal bandwidth of 10, 5, 2.5 or 1.25 MHz, respectively.

The frequency responses of the discrete time decimators and the discrete time filters are dependent on their sample rates. Different signal bandwidths may be supported by varying the sample rates to match the desired signal bandwidth. This may then result in the same relative filtering for different signal bandwidths. For example, the bandwidth of discrete time filter 322 may be set to a predetermined percentage of the sample rate. The sample rate may be varied based on the desired signal bandwidth, and the filter bandwidth may then track the desired signal bandwidth.

Figure 13:
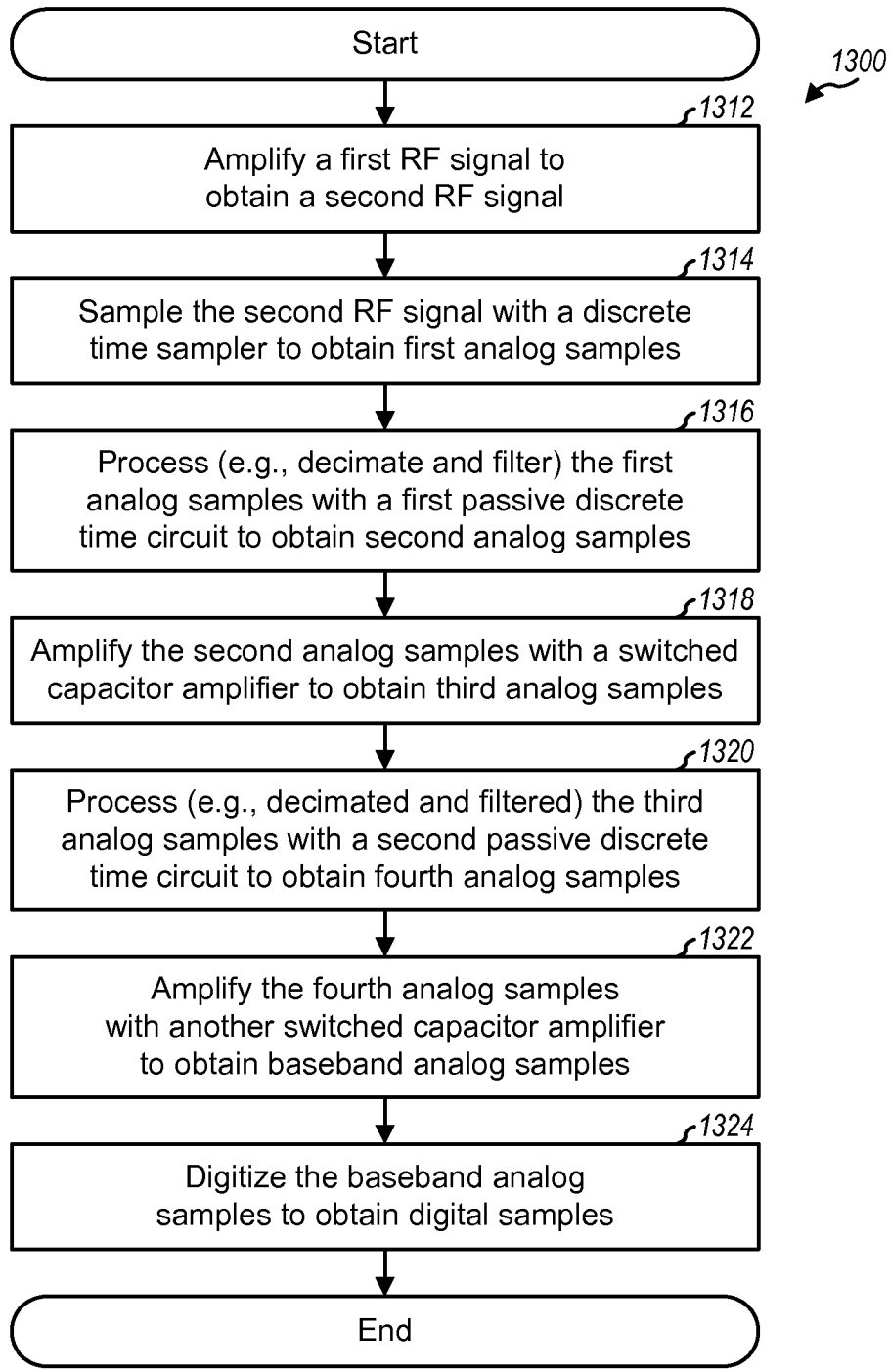
FIG. 13 shows a process performed by the discrete time receiver.

FIG. 13 shows a design of a process 1300 performed by a discrete time receiver. A first RF signal may be amplified (e.g., with an LNTA) to obtain a second RF signal (block 1312). The second RF signal may be sampled with a discrete time sampler to obtain first analog samples (block 1314). In one design of block 1314, the second RF signal may be sampled with multiple phases of a sampling clock at a first rate to obtain the first analog samples at a second rate that is higher than (e.g., twice) the first rate. The first analog samples may be processed with a first passive discrete time circuit to obtain second analog samples (block 1316). In one design of block 1316, the first analog samples may be decimated to obtain decimated analog samples, which may be filtered (e.g., with a discrete time FIR filter and/or a discrete time IIR filter) to obtain the second analog samples.

The second analog samples may be amplified with a switched capacitor amplifier to obtain third analog samples (block 1318). In one design of block 1318, the second analog samples may be amplified with a chopped switched capacitor amplifier by (i) chopping an input signal comprising the second analog samples, (ii) amplifying the chopped input signal to obtain an amplified signal, and (iii) chopping the amplified signal to obtain an output signal comprising the third analog samples.

The third analog samples may be processed (e.g., decimated and filtered) with a second passive discrete time circuit to obtain fourth analog samples (block 1320). The fourth analog samples may be amplified with another switched capacitor amplifier to obtain baseband analog samples (block 1322). In general, the baseband analog samples may be obtained with one or more stages of decimation, one or more stages of filtering, and one or more stages of amplification, which may be arranged in any order. One or more decimation factors may be configurable and determined based on the bandwidth of the signal being received. The baseband analog samples may be digitized based on an ADC clock to obtain digital samples (block 1324). The ADC clock may have a configurable rate determined based on the bandwidth of the signal being received.

The discrete time receiver described herein can support wider system bandwidth (e.g., 20 MHz or more), adaptive signal bandwidth (e.g., from 1.25 to 20 MHz), higher signal constellations (requiring higher SNR), and adaptive frequency planning (e.g., variable signal bandwidth, band aggregation, and RF band). The discrete time receiver can support higher data rates with modest circuit complexity and low power dissipation.

All or part of the discrete time receiver may be implemented on an IC, an analog IC, an RFIC, a mixed-signal IC, an ASIC, a printed circuit board (PCB), an electronics device, etc. All or part of the discrete time receiver may be fabricated with various IC process technologies such as CMOS, NMOS, PMOS, bipolar junction transistor (BJT), bipolar-CMOS (BiCMOS), silicon germanium (SiGe), gallium arsenide (GaAs), etc.

An apparatus implementing all or part of the discrete time receiver may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   a discrete time sampler operative to sample a radio frequency (RF) signal based on a sampling clock at a first rate and provide first analog samples at a second rate higher than the first rate; and a discrete time circuit operative to process the first analog samples and provide second analog samples at a third rate lower than the first rate;

wherein the discrete time sampler comprises:
a first switch coupled between a first input and a first output of the discrete time sampler,
a second switch coupled between the first input and a second output of the discrete time sampler,
a third switch coupled between a second input and the first output of the discrete time sampler, and
a fourth switch coupled between the second input and the second output of the discrete time sampler, the first and fourth switches being enabled by a first phase of the sampling clock, the second and third switches being enabled by a second phase of the sampling clock, the first and second inputs receiving the RF signal, the first and second outputs providing the first analog samples, and the second rate being twice the first rate.

2. The apparatus of claim 1, further comprising a receiver, wherein the apparatus is integrated with the receiver.

3. An apparatus, comprising:
a discrete time sampler configured to:
sample a radio frequency (RF) signal at a first rate, wherein the first rate is based on a second rate of a local oscillator output; and
provide first analog samples at the first rate, wherein the first rate is higher than the second rate; and
a discrete time circuit configured to:
process the first analog samples to obtain second analog samples; and
provide the second analog samples at a third rate that is lower than the second rate.

4. The apparatus of claim 3, wherein the discrete time circuit comprises:
a discrete time decimator configured to decimate the first analog samples and provide decimated analog samples, and
a discrete time filter configured to filter the decimated analog samples and provide the second analog samples.

5. The apparatus of claim 3, wherein the apparatus is an integrated circuit.

6. The apparatus of claim 3, wherein the discrete time circuit comprises a discrete time finite impulse response (FIR) filter configured to perform filtering of the first analog samples.

7. The apparatus of claim 3, wherein the discrete time circuit comprises a discrete time infinite impulse response (IIR) filter configured to perform filtering of the first analog samples.

8. The apparatus of claim 3, further comprising:
a switched capacitor amplifier configured to amplify the second analog samples and provide third analog samples;
wherein the switched capacitor amplifier comprises a chopped switched capacitor amplifier comprising:
an input chopping circuit configured to chop an input signal comprising the second analog samples,
an amplifier section configured to amplify the chopped input signal and provide an amplified signal, and
an output chopping circuit configured to chop the amplified signal and provide an output signal comprising the third analog samples.

9. The apparatus of claim 3, further comprising:
a switched capacitor amplifier configured to amplify the second analog samples and provide third analog samples; and a passive discrete time circuit configured to process the third analog samples and provide fourth analog samples.

10. The apparatus of claim 9, wherein the passive discrete time circuit is configured to perform decimation by a configurable factor selected based on bandwidth of a signal being received.

11. The apparatus of claim 9, wherein the apparatus is an integrated circuit.

12. The apparatus of claim 3, wherein the discrete time circuit comprises a discrete time decimator configured to perform decimation of the first analog samples.

13. The apparatus of claim 3, wherein the discrete time circuit comprises a discrete time filter configured to perform filtering of the first analog samples.

14. The apparatus of claim 3, further comprising:
a switched capacitor amplifier configured to amplify the second analog samples and provide third analog samples.

15. The apparatus of claim 14, further comprising:
a passive discrete time circuit configured to process the third analog samples and provide fourth analog samples.

16. The apparatus of claim 15, further comprising:
a second switched capacitor amplifier configured to amplify the fourth analog samples and provide fifth analog samples.

17. The apparatus of claim 3, further comprising:
an analog-to-digital converter (ADC) operative to digitize baseband analog samples and provide digital samples, wherein the baseband analog samples are derived based on the second analog samples.

18. The apparatus of claim 17, wherein the ADC is configured to digitize the baseband analog samples based on an ADC clock having a rate based on a bandwidth of a signal being received.

19. The apparatus of claim 3, wherein the discrete time circuit performs decimation by a factor based on a bandwidth of a signal being received.

20. The apparatus of claim 3, further comprising a receiver, wherein the apparatus is integrated with the receiver.

21. A method, comprising:
amplifying a first radio frequency (RF) signal to obtain a second RF signal;
sampling the second RF signal at a first rate, wherein the first rate is based on a second rate of a local oscillator output, the sampling of the second RF signal produces first analog samples at the first rate, and the first rate is higher than the second rate; and
processing the first analog samples with a passive discrete time circuit to obtain second analog samples, wherein the second analog samples have a third rate that is lower than the second rate.

22. The method of claim 21, wherein the sampling the second RF signal comprises sampling the second RF signal with multiple phases of the local oscillator output to obtain the first analog samples.

23. The method of claim 21, wherein the processing the first analog samples comprises:
decimating the first analog samples to obtain decimated analog samples, and
filtering the decimated analog samples to obtain the second analog samples.

24. The method of claim 21, further comprising:
amplifying the second analog samples with a switched capacitor amplifier to obtain third analog samples.

25. The method of claim 24, wherein the amplifying the second analog samples comprises:

chopping an input signal comprising the second analog samples,
amplifying the chopped input signal to obtain an amplified signal, and
chopping the amplified signal to obtain an output signal comprising the third analog samples.

26. The method of claim 24, further comprising:
processing the third analog samples with a second passive discrete time circuit to obtain fourth analog samples.

27. The method of claim 21, further comprising:
deriving baseband analog samples based on the second analog samples; and
digitizing the baseband analog samples based on a clock to obtain digital samples, wherein the clock has a configurable rate determined based on a bandwidth of a signal being received.

28. An apparatus, comprising:
means for amplifying a first radio frequency (RF) signal to obtain a second RF signal;
means for sampling the second RF signal at a first rate, wherein the first rate is based on a second rate of a local oscillator output, the sampling of the second RF signal produces first analog samples at the first rate, and the first rate is higher than the second rate; and
means for processing the first analog samples to obtain second analog samples, wherein the second analog samples have a third rate that is lower than the second rate.

29. The apparatus of claim 28, wherein the means for sampling the second RF signal comprises means for sampling the second RF signal with multiple phases of the local oscillator output to obtain the first analog samples.

30. The apparatus of claim 28, wherein the means for processing the first analog samples comprises:
means for decimating the first analog samples to obtain decimated analog samples, and
means for filtering the decimated analog samples to obtain the second analog samples.

31. The apparatus of claim 28, further comprising:
means for amplifying the second analog samples to obtain third analog samples.

32. The apparatus of claim 31, wherein the means for amplifying the second analog samples comprises:
means for chopping an input signal comprising the second analog samples,
means for amplifying the chopped input signal to obtain an amplified signal, and
means for chopping the amplified signal to obtain an output signal comprising the third analog samples.

33. The apparatus of claim 28, further comprising:
means for deriving baseband analog samples based on the second analog samples; and
means for digitizing the baseband analog samples based on a clock to obtain digital samples, wherein the clock has a configurable rate determined based on a bandwidth of a signal being received.

34. The apparatus of claim 28, further comprising a receiver, wherein the apparatus is integrated with the receiver.

* * * * *